United States Patent [19]

Langanke

[11] 4,268,018
[45] May 19, 1981

[54] ELECTRICALLY CONDUCTIVE, TELESCOPING SPRING

[75] Inventor: Rolf Langanke, Boppard, Fed. Rep. of Germany

[73] Assignee: Stabilus GmbH, Fed. Rep. of Germany

[21] Appl. No.: 927,094

[22] Filed: Jul. 24, 1978

[30] Foreign Application Priority Data

Aug. 6, 1977 [DE] Fed. Rep. of Germany ... 7724548[U]

[51] Int. Cl.³ .............................................. F16F 9/54
[52] U.S. Cl. .................................... 267/120; 188/321; 200/61.62; 267/182; 403/24
[58] Field of Search ................ 267/64 R, 64 A, 65 R, 267/120, 179, 182; 188/1 A, 321; 296/56; 200/61.62; 403/24, 56, 77, 133, 225, 296, 372

[56] References Cited

U.S. PATENT DOCUMENTS

| 2,265,899 | 12/1941 | Fine | 200/61.62 |
| 2,502,915 | 4/1950 | Atkins et al. | 403/225 |
| 2,592,698 | 4/1952 | Hubbard | 403/372 |
| 2,818,293 | 12/1957 | Klein et al. | 403/372 |
| 3,753,584 | 8/1973 | Kindel et al. | 403/133 |
| 3,919,509 | 11/1975 | Schnitzius | 200/61.62 |
| 4,089,512 | 5/1978 | Allinquant et al. | 267/65 R |
| 4,118,131 | 10/1978 | Schnitzius | 267/120 |

FOREIGN PATENT DOCUMENTS

| 2128210 | 1/1973 | Fed. Rep. of Germany | 267/64 R |
| 7323902 | 2/1977 | Fed. Rep. of Germany | |
| 7603201 | 3/1977 | Fed. Rep. of Germany | |
| 2732678 | 1/1978 | Fed. Rep. of Germany | 188/1 A |
| 1108284 | 1/1956 | France | 188/1 A |
| 205630 | 6/1966 | Sweden | 403/133 |
| 624748 | 6/1949 | United Kingdom | 403/372 |

*Primary Examiner*—Edward R. Kazenske
*Attorney, Agent, or Firm*—Brumbaugh, Graves, Donohue & Raymond

[57] ABSTRACT

A spring arrangement includes a cylinder member and a plunger member axially movable inward and outward of the cylinder cavity and resiliently biased outward of the cavity. The members conductively engage each other at rest and at least during a portion of the axial plunger member movement. They carry respective conductive terminals outside the cylinder cavity. The two spring members each may be hingedly connected to associated structures by means of a first connector, a first fastening device made of metallic material for fixedly fastening the element to the spring member, a second connector element secured to the first element for pivotal movement, and a second fastening device for fastening the second connector element to the associated structure. Insulation is interposed between the spring member and the associated structure for preventing flow of electric current in a path including the two elements and the two fastening devices.

8 Claims, 11 Drawing Figures

4,268,018

ELECTRICALLY CONDUCTIVE, TELESCOPING SPRING

BACKGROUND FIELD OF THE INVENTION

This invention relates to electrically conductive, telescoping springs, and particularly to a spring arrangement including such a spring and fastening devices for fastening it between associated structures.

In its more specific aspects, the invention will be described hereinbelow in its application to the supply of electric current to a current consuming device on the tail gate of an automotive vehicle and a current source on another portion of the vehicle body, but it is not limited to this application.

THE PRIOR ART

Conductive springs were proposed for the same purpose in German Utility Models Nos. 7,323,902 and 7,603,281, and presented a significant advance over earlier devices for supplying current to devices mounted on tail gates of automotive vehicles and the like. However, the known conductive springs are not always as reliable during extended periods of operation under unfavorable conditions as would be desirable, and this invention aims at avoiding the shortcomings of the known spring arrangements.

More particularly, the invention provides a spring arrangement including a spring having a cylinder member and a plunger member secured to the cylinder member for axial movement inward and outward of the cylinder cavity and resiliently biased outward of the cavity. The plunger member conductively engages the cylinder member during at least a portion of its axial movement. The two members carry respective electrically conductive terminals outside the cylinder cavity and may each be connected hingedly to associated structure by connecting devices which each include a first connector element, a first fastening device made of metallic material for fixedly fastening the first connector element to a spring member, a second connector element secured to the first element for pivotal movement, and a second fastening device for fastening the second connector element to associated structure. Insulation is interposed between the spring member and the associated structure in such a manner as to prevent the flow of electric current in a path which includes the first and second connector elements and the first and second fastening devices.

Other features, additional objects, and many of the attendant advantages of this invention will readily be appreciated as the same becomes better understood from the following detailed description of preferred embodiments when considered in connection with the appended drawing in which:

BRIEF DESCRIPTION OF THE DRAWINGS

FIGS. 2 to 7 illustrate modified elements of universal-joint connections in the manner of FIG. 1a.

DETAILED DESCRIPTION

Figure 1:
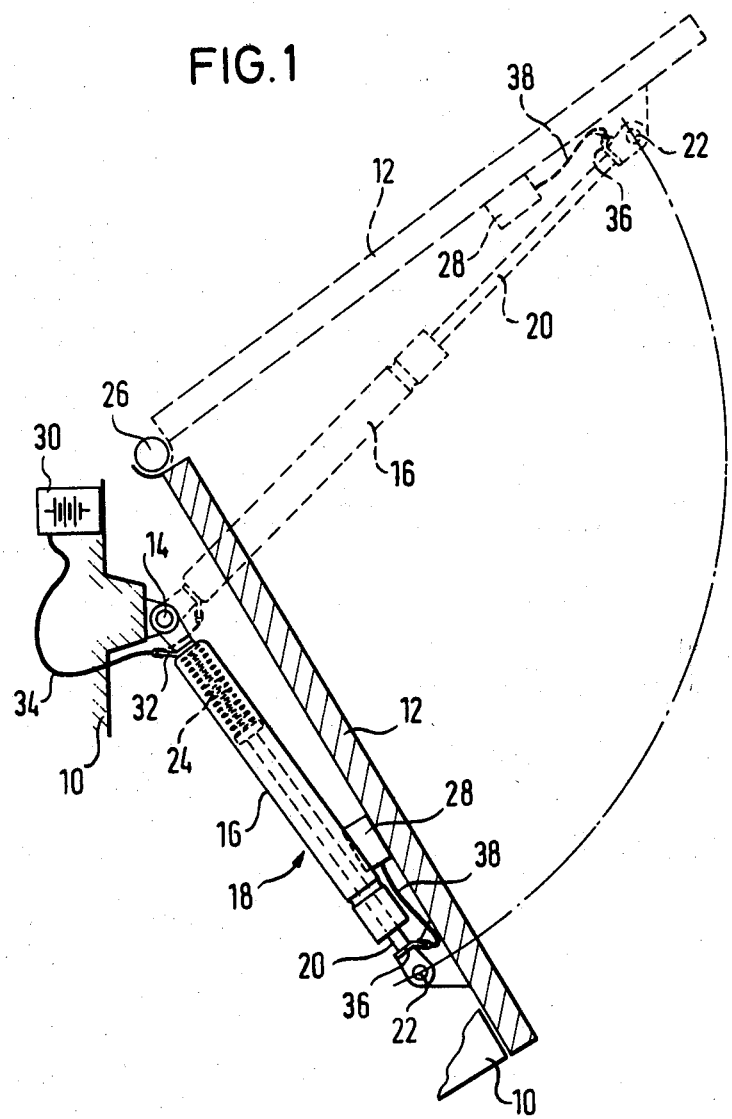
FIG. 1 shows elements of a motorcar equipped with a conductive spring of the invention in elevation and partly in section.

Referring initially to FIG. 1, there is shown only as much of the body 10 and of a tail gate 12 of an automotive vehicle as is needed for an understanding of this invention. A pivot 14 fastens the closed end of a cylinder 16 in a telescoping spring 18 to the body 10. A plunger 20 axially projects from the cylinder cavity at the other end of the cylinder 16 and is attached to the bottom of the tail gate 12 by a pivot 22. A helical compression spring 24 in the cylinder 16 biases the plunger 20 outward of the cylinder. Another pivot 26 above the pivot 14 secures the top of the tail gate 12 to the car body 10 in such a position that the pressure of the spring 24 acting on the plunger 20 assists in swinging the tail gate 12 from the closed position shown in fully drawn lines toward the open position shown in broken lines.

A windshield wiper motor 28 is mounted on the tail gate for actuating a windshield wiper, not shown. It may be energized with current from a battery 30 on the car body 10. A terminal 32 on the closed end of the cylinder 16 is connected with one pole of the battery 30 by a cable 34, and a cable 38 connects a terminal 36 on the piston rod 20 with the motor 28 so that the motor may be energized when the plunger conductively engages the cylinder at rest and during each axial movement. The return flow of current passes through the metallic tail gate 12, pivot 26, and car body 10 to the battery 30, as is conventional. This current supply system for the motor 28 relies for operativeness on insulation of the spring 18 from the motorcar body 10 and tailgate 12, as is not clearly visible on the scale of FIG. 1.

Figure 1A:
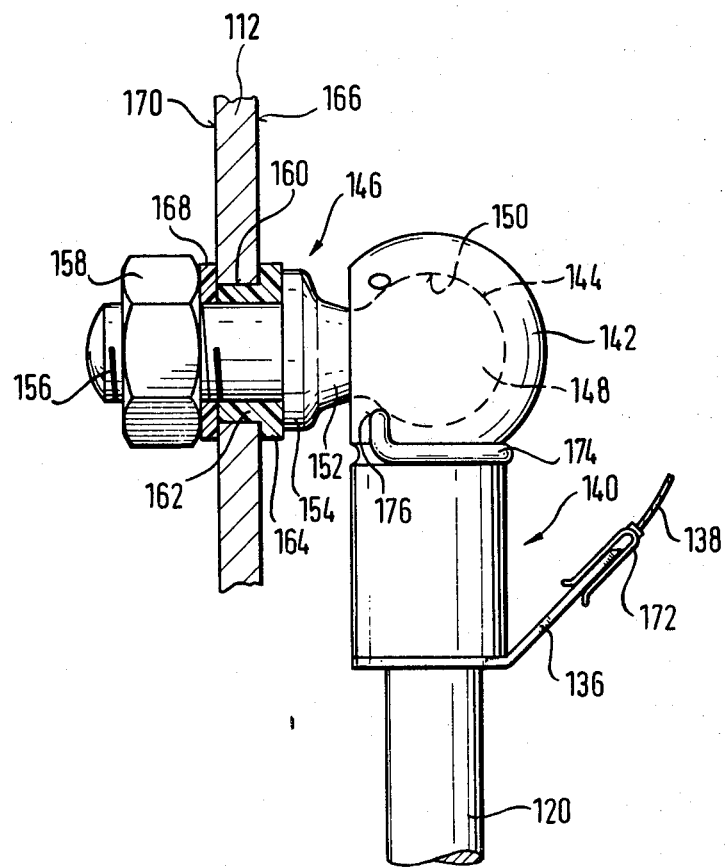
FIG. 1a shows a universal-joint connection and elements fastened thereby for use in the car of FIG. 1 in side elevation and partly in section.

An electrically insulating, hinged mechanical connection for a minimally modified car is shown in FIG. 1a. Only the outer end of the plunger 120 of a telescoping spring identical with or closely similar to the afore-described spring 18 is shown in FIG. 1a. It carries a longitudinally terminal connector 140 including a socket 142 whose cavity is bounded by a spherically curved internal surface 144. A mating connector 146 is mounted on, but electrically insulated from the tail gate 112 of the car only partly shown in FIG. 1a. The connector 146 has a ball-shaped portion 148 whose spherically convex face 150 slidably engages the surface 144 of the socket 142. A reduced neck portion 152 integrally connects the ball portion 148 with an abutment shoulder 154 on a partly threaded shank 156 carrying an abutment nut 158. A passage 160 in the tail gate 112 receives a plastic grommet 162 whose radial flange 164 is clamped between a face of the shoulder 154 and a major, planar face 166 of the tail gate 112. A plastic washer 168 is similarly clamped by a face of the nut 158 against the other major face 170 of the tail gate 112. The tubular part of the grommet forms an insulating layer on the surface portion of the shank 156 between the abutment faces of the shoulder 154 and the nut 158. The tail gate thus is electrically insulated from the ball-and-socket connection between the tail gate and the plunger 120.

A blade-shaped terminal 136 on the plunger 120 is releasably engaged by a contact clip 172 on the end of a cable 138, analogous to the afore-described cable 38 as a source of energizing current for a current consuming device on the tail gate 112. A spring wire 174 is partly received in a circular, external groove of the socket 142, and its ends extend into the cavity of the socket between the neck portion 152 and the ball portion 148 of the connector 146 to prevent accidental escape of the ball portion 148 from the socket cavity.

Much of the structure illustrated in FIG. 1A is duplicated in the non-illustrated portion of the apparatus corresponding to the pivot 14 illustrated in FIG. 1 and connects the closed radial end wall of the cylinder, not itself shown in FIG. 1A to the body of a motor vehicle, either the ball portion or the socket portion of the universal joint being attached to the cylinder.

Figure 2:
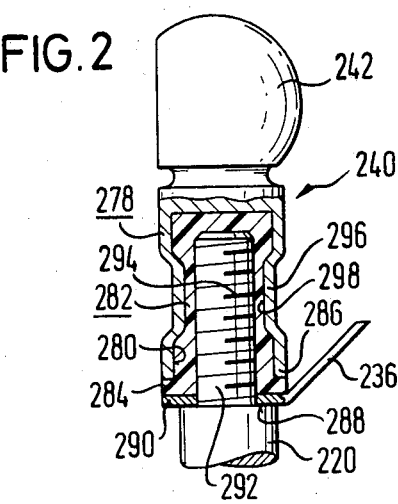

Elements of the device of FIG. 2 which have equivalents in the structure of FIG. 1a are designated by numerals having identical last two digits, the first being increased by 1. Only the socket element 240 of a ball-and-socket pivot is shown in FIG. 2, and the associated ball element may be identical with the connector 146 described above with reference to FIG. 1a, but it may be mounted in direct, electrically conductive contact on the tail gate.

The socket element 240 includes a metallic fastening sleeve 278 of generally circular cross section which bounds a cavity 280 open in an axial direction away from the hollow socket portion 242. A cup-shaped, plastic bushing 282 which is radially closed at one axial end and provided with a radial flange 284 at the other end is conformingly received in the cavity 280. A sheet metal eye 290 integral with a blade-shaped projecting terminal 236 is clamped between the flange 284 and a shoulder 288 of the plunger 220 of a spring not otherwise shown. The flange 284 mechanically and electrically separates the eye 290 from the annular rim 286 about the orifice of the sleeve 278. The free end 292 of the plunger 220 is of reduced diameter and threaded, and its threads 294 are matingly received in the bushing 282. A shallow circumferential groove rolled into the outer face of the sleeve 278 after insertion of the bushing 282 axially secures the bushing in the sleeve by engagement of a corresponding, annular, internal projection 296 of the sleeve received in an annular recess 298 of the bushing 282.

Figure 3:
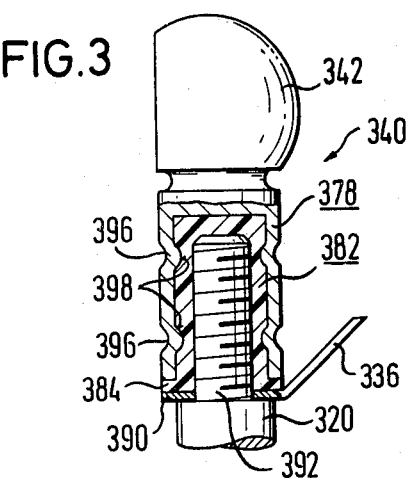

The connector element 340 shown in FIG. 3 is similar to that illustrated in FIG. 2. Identical elements are referenced by numerals augmented by 100 and will not again be described in all instances. The insulating bushing 382 is axially secured in the metallic sleeve 378 by two axially spaced, annular projections 396 on the sleeve which are received in mating recesses 398 of the bushing 382.

Figure 4:
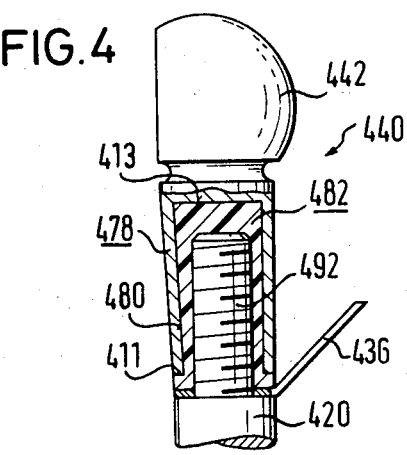

Reference numerals in FIG. 4 are increased by 200 over numerals in FIG. 2 designating analogous or identical structure. The bushing 482 is axially fastened in the cavity 480 of the metallic fastening sleeve 478 by a conical taper of the sleeve from its closed end 413 to the open end 411, the wall thickness of the bushing 482 decreasing in the same direction to accommodate the uniform cross section of the threadedly received free end 492 of the plunger 420.

Figure 5:
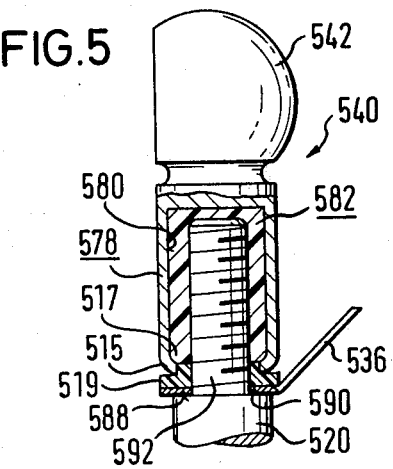

In the connector 540 illustrated in FIG. 5, an integral metal sleeve 580 on the socket 542 terminates at its open end in an in-turned rim 515 to define an orifice smaller than the rounded open end 517 of a plastic bushing 582, and thereby to retain the bushing in the sleeve cavity 580. A plastic grommet 519 of L-shaped axial section and a sheet metal eye 590 are clamped between a shoulder 588 of the partly illustrated plunger 520 and the end 517 of the bushing 582 by threaded engagement of the reduced plunger end 592 with the bushing 582 so that a terminal blade 536 on the eye 590 is insulated from the rim 515 by the grommet 519.

Figure 6:
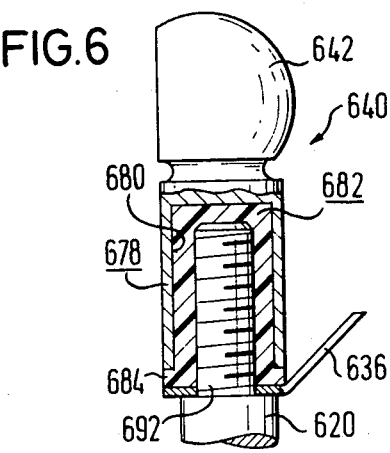

The connector 640 shown in FIG. 6 is almost identical with that seen in FIG. 2 except for a layer of adhesive, not capable of pictorial representation on the scale of the drawing, which fixedly fastens the bushing 682 in the cavity 680 of the metallic sleeve 678, so that the sleeve does not need a projection corresponding to the projection 296 shown in FIG. 2, and the bushing lacks the mating recess 298. As in FIG. 2, the plunger 620, its reduced, threaded end 692, a sheet metal eye 684, and the terminal 636 are conductively connected with each other and electrically insulated by the flange 684 and other parts of the bushing 682 from the socket portions 642 of the connector.

Figure 7:
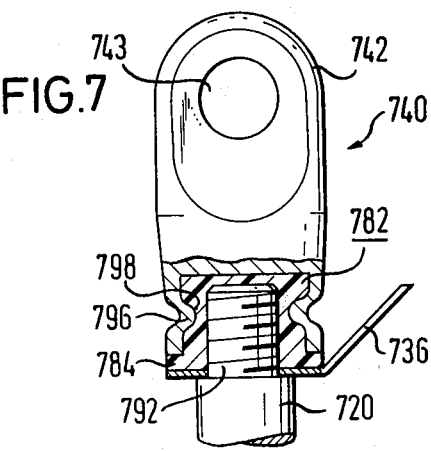

The connector 740 illustrated in FIG. 7 includes a metallic lug 742 provided with a bore 743 for a pivot pin on the tail gate, not itself seen in FIG. 7. An integral sleeve portion of the lug 742 is lined with a cup-shaped, plastic bushing 782 secured in the cavity of the sleeve portion by an internally projecting, annular rib 796 of the sleeve portion which is received conformingly in a recess 798 of the bushing 782. A radial flange 784 of the bushing and a shoulder of a plunger 720 clamp therebetween a sheet metal eye on a contact blade 736, the clamping pressure being provided by a threaded, reduced end portion 792 of the plunger matingly received in the bushing 782.

The terminal on the plunger of a telescoping spring of the invention is insulated from the associated pivotal connector on the tail gate by electrically insulating elements separating portions of the connector on the plunger, and the terminal on the spring cylinder is insulated from the associated pivotal connector on the car body in the same manner, not specifically illustrated, in the embodiments of the invention shown in FIGS. 1a to FIG. 7. In the embodiments to be described with reference to FIGS. 8 to 10, insulating material is provided at the interface of the two hingedly cooperating connectors.

Figure 8:
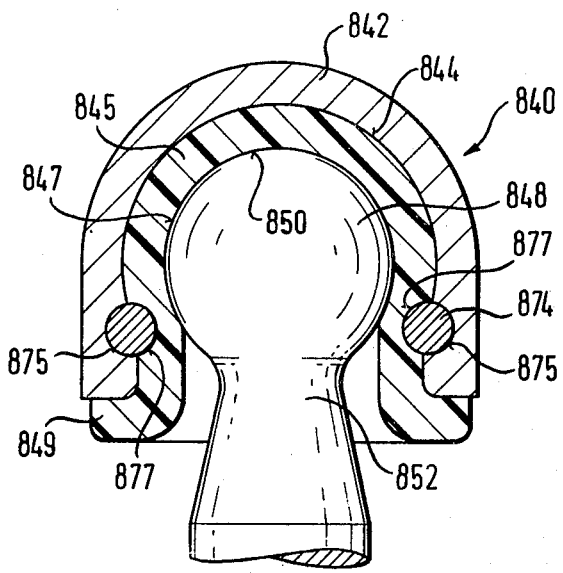
FIGS. 8–10 show additional universal-joint connections in fragmentary side-elevational section.

The connector 840 illustrated in FIG. 8 is attached to a plunger in the manner illustrated in FIG. 1a. Its socket shell 842 has an inner face 844 which is spherically arcuate and covered by a layer 845 of electrically insulating plastic. An integral flange 849 of the layer 845 covers the rim about the orifice of the shell 842. The ball portions 848 of a connector on a tail gate, not itself shown in FIG. 8, has a spherically arcuate face which slidably engages the plastic layer 845, and its integral neck portion 852 is prevented from accidental, conductive contact with the shell 842 by the flange 849. A wire loop 874 passing through two bores 875 of the shell 842 is partly received in recess 877 of the plastic layer 845 which consists of polyamide composition sufficiently rigid to be secured in the shell 842 together with the ball portion 848 by the wire loop 874 as has been described with reference to analogous structure in FIG. 1a.

Figure 9:
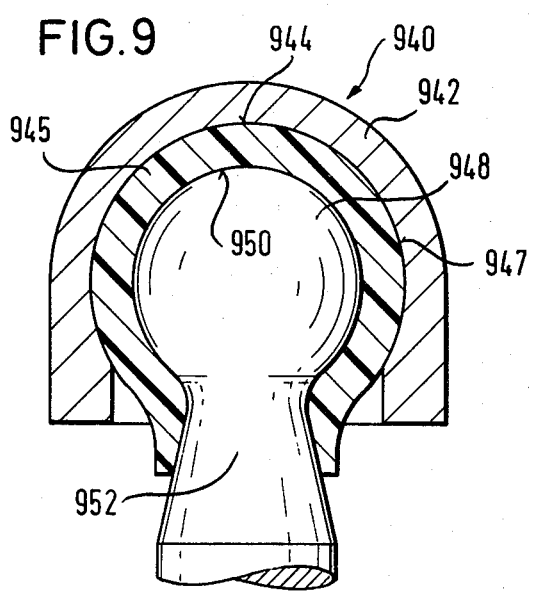

In the hinged connector assembly shown in FIG. 9, which is the functional equivalent of the devices shown in FIGS. 1a and 8, the spherically arcuate surface 850 of a ball-shaped connector 848 and the contiguously adjacent surface part of a neck portion 952 are covered by a plastic layer 945 held in position by its conforming engagement with the covered connector portions. Its outer face 947 slidably engages the inner, spherically arcuate face 944 of the metallic socket shell 942 of the other connector 942. The cavity of the shell 942 has an orifice sufficiently narrower than the outer diameter of the plastic layer 945 in the illustrated relaxed condition to prevent accidental release of the connector 848 from the shell 942 under normal operating stresses, but the plastic layer is somewhat resilient to permit insertion of the plastic-coated connector 848 during assembly.

Figure 10:
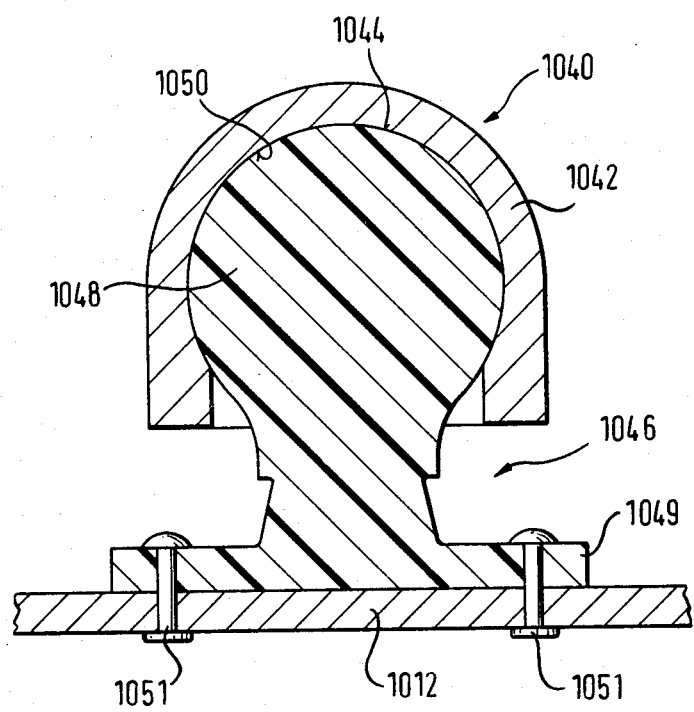

The connector 1046 shown in FIG. 10 is a unitary body of plastic having a ball-shaped portion 1048 movably received in the cavity of a metallic socket shell 1042 of the hingedly cooperating other connector 1040. Respective, spherically arcuate faces 1044, 1050 of the shell and the ball portions slidably engage each other. The shell 1042 is conductively attached to the plunger of a telescoping spring and an electric terminal on the same as is shown in FIG. 1a. An integral, circular base plate 1049 on the ball portion 1048 outside the shell 1042 is attached to a tail gate 1012 by rivets 1051, thereby insulating the spring from the tail gate. A practically identical hinged connection, not illustrated, hingedly fastens the spring cylinder to the car body.

It should be understood, of course, that the foregoing disclosure relates only to preferred embodiments, and that it is intended to cover all changes and modifications of the examples of the invention herein chosen for the purpose of the disclosure which do not constitute departures from the spirit and scope of the invention set forth in the appended claims.

What is claimed is:

1. In a spring arrangement comprising (a) a spring including a cylinder member bounding a cavity and having an axis, a plunger member secured to said cylinder member for axial movement inward and outward of said cavity, and resilient means in said cavity for biasing said plunger member outward of said cavity, said plunger member conductively engaging said cylinder member during at least a portion of said axial movement; (b) an electrically conductive terminal mounted on each of said members outside said cavity; and (c) connecting means for connecting each of said members to associated structure for movement relative thereto, the improvement wherein each connecting means comprises:

(1) a first connector element carried by one member of said spring, said first connector element being made of metallic material and formed with a recess opening towards said one member and terminating in a rim portion bounding the open end thereof for receipt therein of a reduced-diameter end portion of said one member, said reduced-diameter end portion defining at the juncture thereof with the main portion of said one member a shoulder facing said rim portion of said connector element;

(2) a second connector element coupled to said first connector element for pivotal movement relative thereto;

(3) fastening means for fastening said second connector element to said associated structure;

(4) insulating means, including a substantially cup-shaped member of insulating material in said recess in surrounding relation to the end and sides of said reduced-diameter end portion and a flange member of insulating material interposed between said rim portion and said shoulder, for electrically insulating said one member from said first connector element, thereby preventing the flow of electric current in a path including said first and second connector elements; and (5) means for respectively securing said end portion of said one member to said cup-shaped member and said cup-shaped member to said first connector element.

2. An arrangement as set forth in claim 1, wherein one of said terminals has a portion fastened between said shoulder and said flange member so as to be in electrical contact with said one member and electrically insulated from said first connector element.

3. An arrangement as set forth in claim 1, wherein said one of respectively securing means comprises external threads on said reduced-diameter end portion and mating internal threads on said cup-shaped member.

4. An arrangement as set forth in claim 1, wherein said one of respectively securing means comprises a projection on said first connector element in said recess and means on said cup-shaped member for conformingly receiving said projection to thereby secure said cup-shaped member against movement out of said recess.

5. An arrangement as set forth in claim 1, wherein said one of respectively securing means comprises the rim portion bounding the open end of said recess being inturned and smaller in area than the adjacent portion of said cup-shaped member directed toward said open end.

6. An arrangement as set forth in claim 5, wherein said flange member comprises a separate annular member of insulating material and is interposed between said shoulder and said inturned rim portion.

7. An arrangement as set forth in claim 1, wherein one of said respectively securing means comprises the internal wall of said recess tapering toward said open end and said cup-shaped member conformingly lining said recess.

8. An arrangement as set forth in claim 1, wherein one of said respectively securing means comprises an adhesive for adhesively securing said cup-shaped member to said first connector element.

* * * * *

UNITED STATES PATENT AND TRADEMARK OFFICE
CERTIFICATE OF CORRECTION

PATENT NO. : 4,268,018
DATED : May 19, 1981
INVENTOR(S) : Rolf Langanke

It is certified that error appears in the above—identified patent and that said Letters Patent is hereby corrected as shown below:

First page, 2nd col., 5th line, "2,732,678" should read --2,732,676--;

Col. 1, line 5, "BACKGROUND FIELD OF THE INVENTION" should read --BACKGROUND
    Field of the Invention--;

Col. 3, line 12, after "first" insert --digit--;

Col. 6, line 26, "said one of" should read --one of said--;

Col. 6, line 30, "said one of" should read --one of said--;

Col. 6, line 37, "said one of" should read --one of said--;

Signed and Sealed this

Eighteenth Day of August 1981

[SEAL]

Attest:

Attesting Officer

GERALD J. MOSSINGHOFF

Commissioner of Patents and Trademarks